(12) United States Patent
Andersson

(10) Patent No.: US 9,163,737 B2
(45) Date of Patent: Oct. 20, 2015

(54) CHECK VALVE FOR USE WITH PUMPS CONTROLLED BY VARIABLE FREQUENCY DRIVES

(71) Applicant: Flomatic Corporation, Glens Falls, NY (US)

(72) Inventor: Allan Bo Andersson, Cambridge, NY (US)

(73) Assignee: Flomatic Corporation, Glens Falls, NY (US)

( * ) Notice: Subject to any disclaimer, the term of this patent is extended or adjusted under 35 U.S.C. 154(b) by 241 days.

(21) Appl. No.: 14/022,383

(22) Filed: Sep. 10, 2013

(65) Prior Publication Data
US 2015/0068622 A1    Mar. 12, 2015

(51) Int. Cl.
*F16K 15/03* (2006.01)
*F16K 15/06* (2006.01)
*F16K 17/12* (2006.01)

(52) U.S. Cl.
CPC .......... *F16K 15/06* (2013.01); *F16K 17/12* (2013.01); *Y10T 137/7904* (2015.04); *Y10T 137/7915* (2015.04)

(58) Field of Classification Search
CPC ... F16K 15/06; F16K 17/12; Y10T 137/7909; Y10T 137/7908
USPC .......... 137/516.11, 516.29, 533, 533.19; 251/359, 363
See application file for complete search history.

(56) References Cited

U.S. PATENT DOCUMENTS 4,203,466 A * 5/1980 Hager .................... 137/543

OTHER PUBLICATIONS

U.S. Appl. No. 13/608,516, filed Sep. 10, 2012.
U.S. Appl. No. 13/803,586, filed Mar. 14, 2013.

* cited by examiner

*Primary Examiner* — Kevin Lee
*Assistant Examiner* — P. Macade Nichols
(74) *Attorney, Agent, or Firm* — Heslin Rothenberg Farley & Mesiti P.C.

(57) ABSTRACT

A check valve is provided for use with variable frequency drives and other applications. In one aspect, the check valve provides a poppet guided by a poppet guide in at least two locations to ensure stability between fully open and fully closed positions. In another aspect, the check valve includes a poppet guide adapted to receive a poppet in a stem receiving channel, the stem receiving channel including guide vanes engaging the poppet and auxiliary channels for self cleaning. The check valve may also include a valve seal. In one embodiment, the valve seal is an o-ring received by a poppet head, based of the poppet guide and valve seat. The valve seat and/or the base may include expansion channels to receive a portion of the valve seat during compression when the check valve is in a closed position.

17 Claims, 7 Drawing Sheets

CHECK VALVE FOR USE WITH PUMPS CONTROLLED BY VARIABLE FREQUENCY DRIVES

BACKGROUND

This invention relates generally to the field of valves, and more specifically to valves capable of tolerating a variable flow of fluid

BRIEF SUMMARY

Check valves are designed to permit the flow of fluid in one direction while preventing the fluid from flowing in the reverse direction. Conventional check valves utilize a single poppet valve within a valve housing that controls the flow of fluid therethrough. However, conventional poppet valves are likely to become lodged in the interior seat provided by an annular flange within the valve housing. When this happens, it is almost impossible to dislodge the poppet valve without dismantling the check valve or utilizing a new fitting. Moreover, conventional valves are difficult to assemble and may include many parts and fasteners. It may also be awkward to assemble and/or repair conventional valves because different parts can be located on opposite sides of a valve seat or flange formed within the valve housing.

SUMMARY OF THE INVENTION

The shortcomings of the prior art are overcome and additional advantages are provided through use of a check valve constructed in accordance with one or more principles of the present invention. The check valve constructed in accordance with one or more aspects of the present invention may be used in any type of hydraulic or other fluid flow lines such as, for example, water, fuel or gas lines, wells, cisterns, submersible pump applications, pumping outfits or the like. Additionally, other uses may be made of the invention that fall within the scope of the claimed invention but when are not specifically described below.

In one aspect of the invention, there is provided a check valve for use in a housing that includes an inner peripheral surface defining a passage therethrough between an inlet and an outlet. The check valve comprises a valve seat ring attachable to the housing. The valve seat ring defines a valve seat. The check valve further comprises a poppet guide. The poppet guide includes a base attachable to the valve seat ring, a stem guide, and at least three support legs extending between the base and the stem guide. Each support arm includes an inner peripheral surface. The stem guide includes an inner surface defining a stem receiving channel. At least three stem guide vanes extend radially inward from the inner surface of the stem guide into the stem receiving channel.

The check valve further comprises a poppet. The poppet is moveable between a closed position against the valve seat to a fully open position. The poppet includes a stem connected to a head. The poppet stem is telescopically received by the at least three stem guide vanes in the stem receiving channel of the stem guide. The head includes an outer peripheral surface. At least a first portion of the outer peripheral surface of the head extending circumferentially around the head engages the inner peripheral surfaces of the at least three support legs of the poppet guide as the poppet moves between the closed position to the fully open position. A second portion of the outer peripheral surface of the head extending circumferentially around the head engages the valve seat in the closed position. A third portion of the outer peripheral surface of the head extending circumferentially around the head tapers outward. The check valve further comprises a valve seal valve seal received by the valve seat and the base of the poppet guide. Valve seal forms a seal with the third portion of the outer peripheral surface of the head of the poppet when the check valve is in the closed position. The head is resiliently biased in the closed position against the valve seat.

In another embodiment, the outer peripheral surface of the poppet head includes a channel extending circumferentially around the head for receiving a valve seal. The valve seal engages the valve seat when the poppet is in the closed position. In one embodiment, the outer peripheral surface of the head engages the valve seat on either side of the valve seal. the valve seat includes at least one support for extending the valve seat and providing additional support to the poppet head in the closed position.

In one embodiment, the valve seal is an o-ring. In another embodiment, the valve seat includes an expansion channel for receiving a portion of said valve seal during compression. In yet another embodiment, the base includes an expansion channel for receiving a portion of said valve seal during compression of said valve seal.

In another aspect of the invention, the poppet head is resiliently biased in the closed position against the valve seat by a weight. The weight may be centrally located in or on the poppet head. Unlike a spring, a weight provides the same opening and closing force regardless of where the poppet head is in relation to the valve seat. In another embodiment a spring can be used to assist the poppet for a quicker valve closing if desired at a higher friction or head loss.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

DETAILED DESCRIPTION

Figure 1:
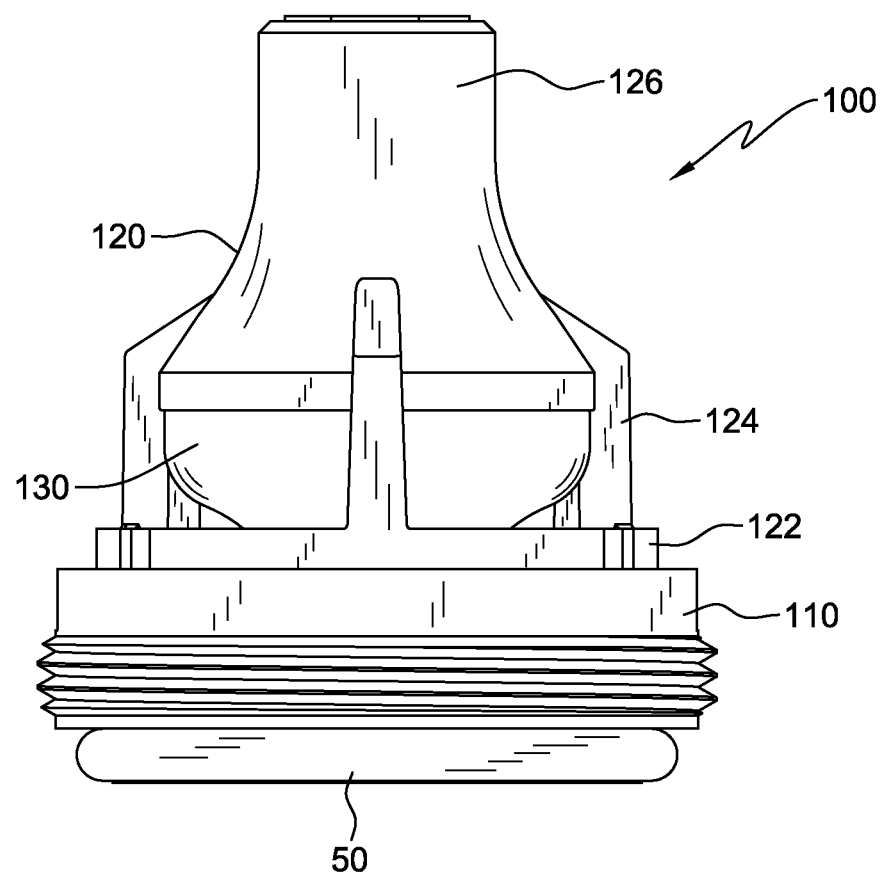
FIG. 1 depicts a side view of a check valve constructed in accordance with one or more aspects of the invention.

For the purposes of promoting an understanding of the principles of a valve designed and constructed in accordance with one or more aspects of the present invention, reference will now be made to the embodiments, or examples, illustrated in the drawings and specific language will be used to describe these. It will nevertheless be understood that no limitation of the scope of the invention is thereby intended. Any alterations and further modifications in the described embodiments, and any further applications of the principles of the invention as described herein are contemplated as would normally occur to one skilled in the art to which the check valve invention relates.

Presented herein is an improved valve capable of handling variable fluid flow in either a vertical or horizontal direction. In traditional applications of fluid control valves, the rate of fluid flow was either very high or very low. Thus, a valve disk would always need to be positioned either in the maximum open position or the maximum closed position to operate properly. However, more recently, variable frequency drives have been used to power pumps, resulting in a variable rate of fluid flow. The variable rate of fluid flow may cause a valve to be disposed at a distance between the maximum open position and the closed position. However, traditional valves do not function properly when used in connection with these variable frequency drive pumps because the pressure exerted against the valve disk is insufficient to displace it to the maximum open position. Consequently, the valve disk is not fully open and not fully supported promoting premature wear on internal valve disk support guides and spring.

Conventional check valves are used in a valve housing. Valve housings include, for example, an inner peripheral surface defining a passage therethough between an inlet port and an outlet port. The valve housing includes a flange dividing the passage between the inlet and outlet ports into an upstream portion and a downstream portion. The flange extends circumferentially around the inner peripheral surface of the housing an defines a valve seat and has an inner surface defining a valve aperture. Conventional check valves include a valve disk in the downstream portion of the valve housing connected to a stem having legs extending through the valve aperture and into the upstream portion of the valve housing. These check valves also include a rubber disk that cooperates with the valve seat forming the valve aperture. The rubber disk seals with the valve seat to prevent leakage of fluid when the valve is in the closed position. This rubber seal is positioned between a valve disk and a valve stem and held tightly by a fastener connecting the valve disk to the valve stem. An example of a valve having this configuration is described in more detail in U.S. Pat. No. 6,581,633 to Andersson, which is hereby incorporated herein by reference. However, assembly and/or repair of these valves are difficult because the valve disk and the valve stem are located on opposite sides of the valve seat or flange formed within the valves. Also, over time, the poppet legs extending through the valve aperture wear causing, for example, the poppet to stick in the valve aperture or degrade the seal surface.

A check valve constructed in accordance with one or more aspects of the invention significantly increases the stability of a check valve by, for example, guiding a poppet of a check valve in at least two locations, both downstream from valve seat, to provide more stable axial movement as the poppet moves between fully open and fully closed positions. A check valve constructed in accordance with one or more aspects of the invention also provides increased stability by using, for example, a weight rather than a spring to bias the check valve in a closed position. A weight provides, for example, the same closing force regardless of where the poppet is position between a fully closed position and a fully open position. A check valve constructed in accordance with one or more aspects of the invention, allows for an unobstructed seat bore and avoid passing any part through the valve aperture that could wear or degrade the seal surface.

By way of example, FIG. 1 depicts a check valve 100. Check valve 100 depicted in FIG. 1 includes a valve ring 110 removeably mounted by, for example, a threaded arrangement, to the inside of a valve housing or to a conventional valve seat, a poppet guide 120 attachable to valve ring 110 and a poppet 130.

Figure 2:
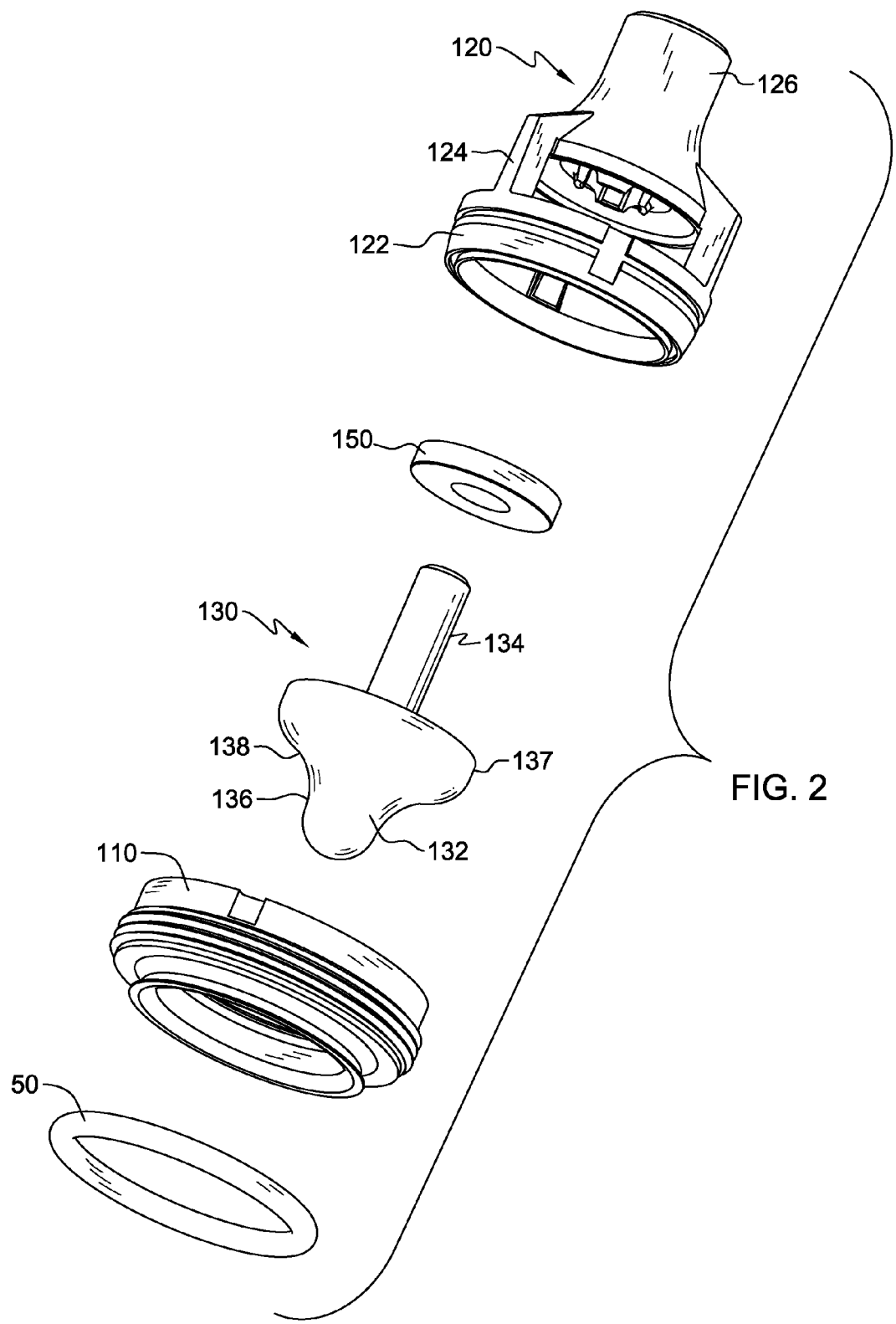
FIG. 2 depicts an exploded view of the check valve shown in FIG. 1 and constructed in accordance with one or more aspects of the invention.
Figure 5:
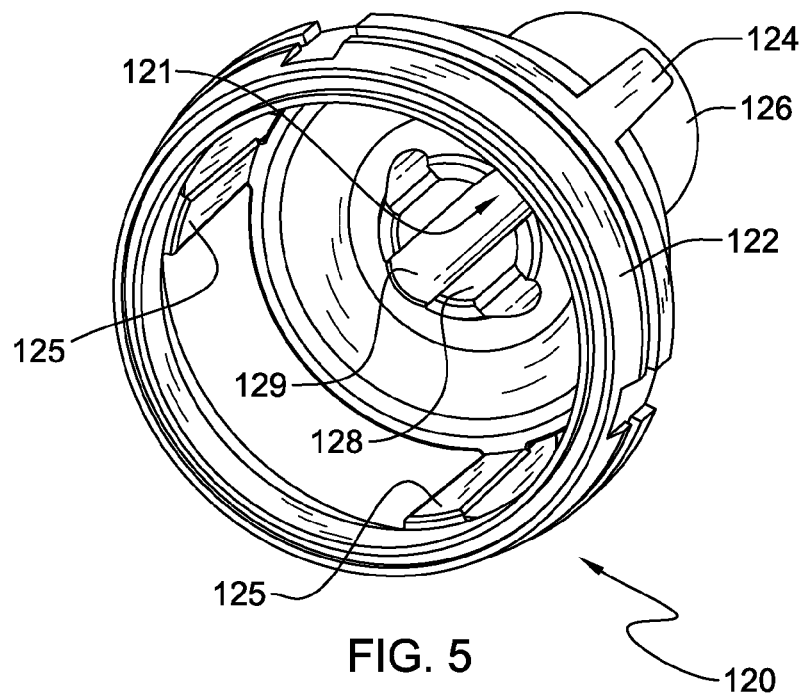
FIG. 5 depicts a bottom perspective view of a stem guide of a check valve constructed in accordance with one or more aspects of the invention.

As illustrated in FIGS. 1, 2 and 5, an example of poppet guide 120 includes a base 122, a stem guide 126, and support legs 124 extending between base 122 and stem guide 126. In one embodiment, base 122 of valve ring 110 may be secured to poppet guide 120 by, for example a snap fit assembly. Poppet guide 120 is further secured when installed in the valve housing by the threaded engagement which prevents any flexing of the outer edge of the valve ring 110. Valve ring 110 may also include a valve seal 112. In one embodiment illustrated in FIG. 6, valve seal 112 is u-shaped and secured in place by the connection between valve ring 110 and poppet guide 120. Valve seal 112 may be, for example, "u" or cup-shaped having an outer surface that engages a portion of an outer surface of poppet 130, as illustrated in the example depicted in FIG. 6, creating a seal that conforms to poppet head 132 when poppet 130 is in the closed position. This seal is mechanically supported between a circular surface area 161 on valve ring 110 and the curved surface area of poppet 130.

Figure 7:
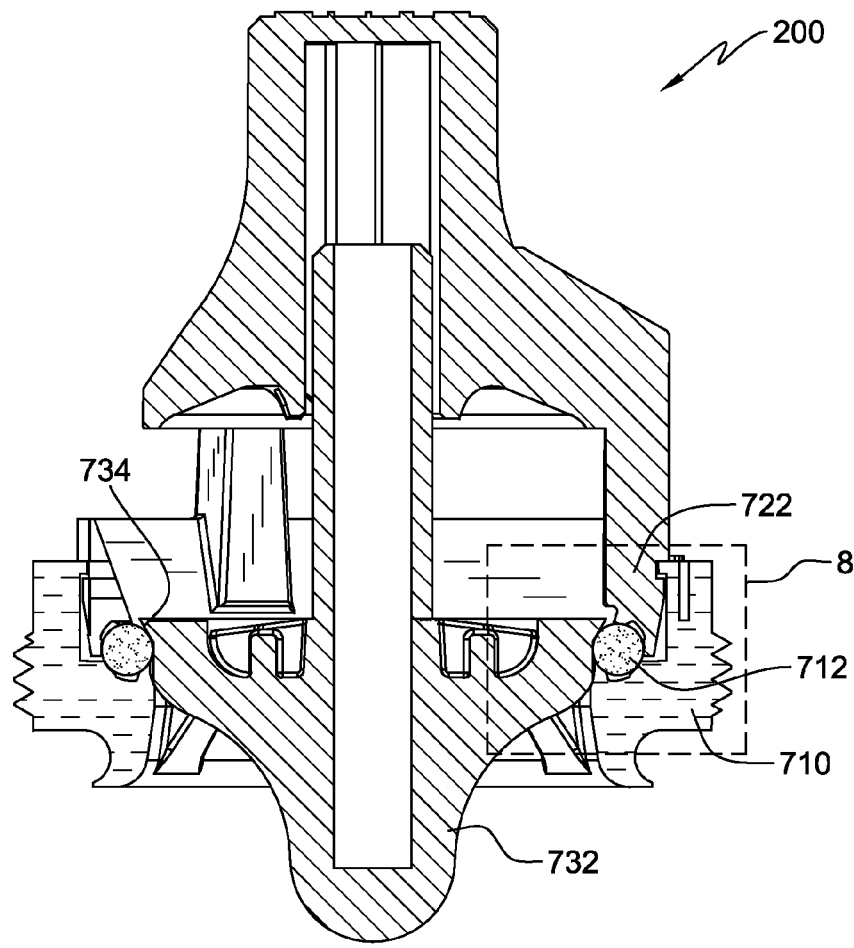
FIG. 7 depicts a longitudinal cross sectional view through a check valve constructed in accordance with one or more aspects of the invention, where the check valve is in a closed position.
Figure 8:
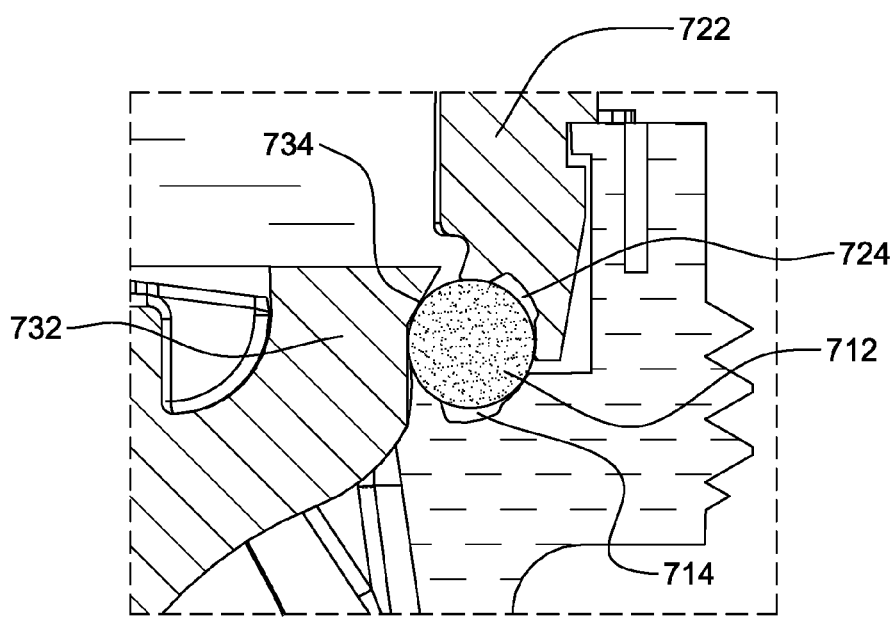
FIG. 8 depicts a partial cross sectional view illustrating another embodiment of a check valve constructed in accordance with one or more principles of the present invention including a valve seal engaging a base of a poppet guide, outer peripheral surface of a poppet head and valve seat in a closed position.

In an alternate embodiment, as illustrated in FIGS. 7 and 8, check valve 200 includes valve seal 712 in the form of, for example, an o-ring. When check valve 200 is in a closed position, valve seal 712 engages a portion of an outer surface of poppet 730 creating a seal that conforms to poppet head 732. This seal is mechanically supported by poppet head 732, base 722 and valve ring 710 when check valve 200 is in the closed position. In one embodiment, the surface of base 722 that receives and supports a portion of valve seal 712 includes an expansion channel 724 formed in base 722. The surface of valve ring 710 that receives and supports a portion of valve seal 712 may also include an expansion channel 714 formed in valve seat 712. Expansion channels 714 and 724 provide an area that valve seal 712 can expand during compression, e.g. when valve 200 is closing or closed, to form a tight seal with poppet head 732, base 722 and valve ring 710. In one embodiment, the upper outer surface 734 of poppet head 732 is tapered outwardly to provide a mating surface to mechanically support, with base 722 and valve ring 710, valve seal 712 and seal check valve 200 in a closed position. In one example, the upper outer surface 734 is tapered at an angle of thirty degrees relative to the vertical outer surface of poppet head 732, although other tapering angles may be used.

Valve seals 712 provides some benefits over the use of u-shaped valve seal 112 because, for example, valve seal 712 is smaller, more cost effective to make and install, and provides a tighter seal. Valve seal 712 is also, for example, more reliable, provides a smoother release of poppet head 732 during opening and results in, much less turbulence and vibration than u-shaped valve seal 112 during operation of a check valve constructed in accordance with one or more aspects of the present invention.

Figure 9:
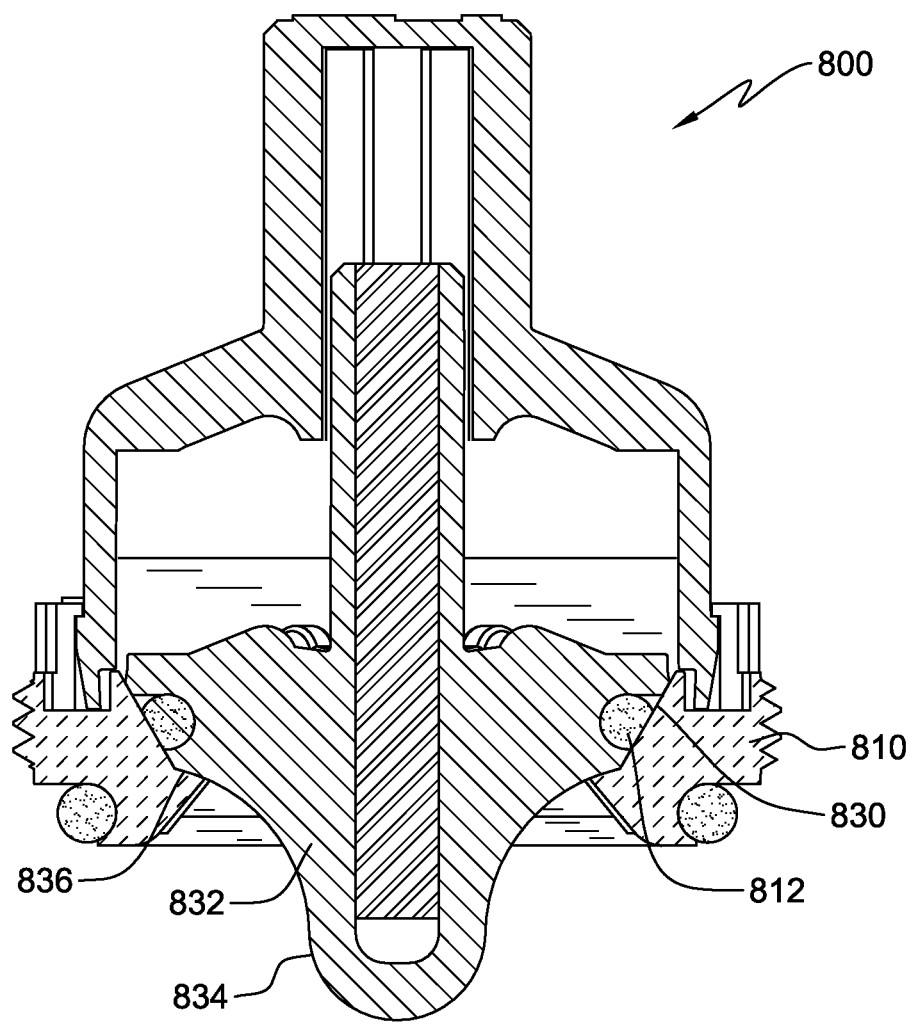
FIG. 9 depicts a partial cross sectional view illustrating another embodiment of a check valve constructed in accordance with one or more principles of the present invention including a valve seal in a channel form in a poppet head and engaging a valve seat in a closed position.
Figure 10:
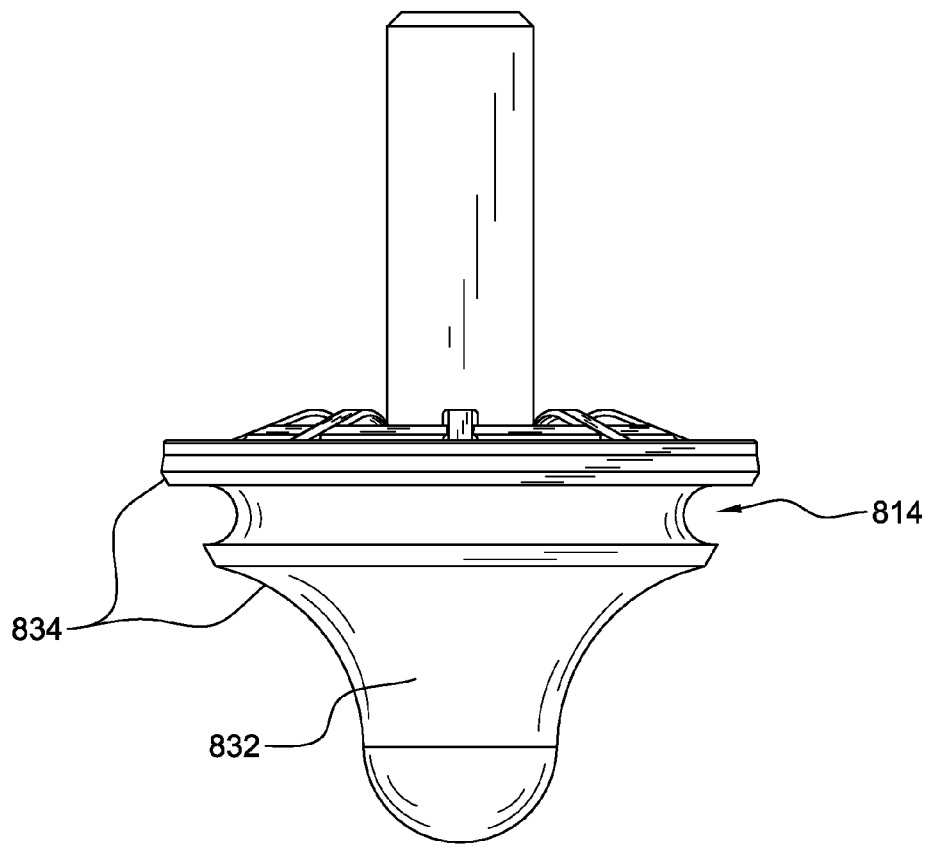
FIG. 10 depicts a front view of one embodiment of a poppet used in the check valve illustrated in FIG. 9.
Figure 11:
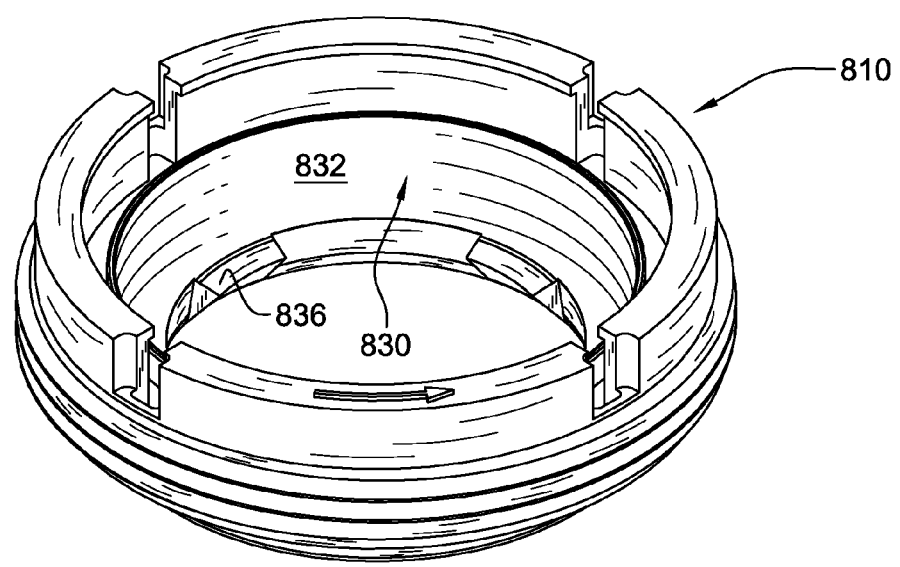
FIG. 11 depicts a perspective view of one embodiment of a valve ring used in the check valve illustrated in FIG. 9.

FIGS. 9-11 illustrate another embodiment of a check valve constructed in accordance with one or more principles of the present invention. As shown in FIGS. 9-11, check valve 800 includes valve seal 812 in the form of, for example, an o-ring. At least a portion of valve seal 812 is received in a space, channel or notch 814 extending circumferentially around or in an outer surface 834 of poppet head 832. Check valve 800 also includes a valve ring 810 including a valve seat 830. Valve seat 830 includes a surface 832 facing outer surface 834 of poppet head 832 and slanting radially inward for receiving poppet head 832. The contour of valve seat 830 allows for more laminar flow during low and high flow condition resulting in higher flow efficiencies and less turbulence.

When check valve 800 is in a closed position, as shown in FIG. 9, valve seal 812 engages a portion of surface 832 of valve seat 830 creating a seal. This seal is mechanically supported by outer surface 832 of poppet head 832 by contacting valve seat 830 above and/or below valve seal 812 when check valve 200 is in the closed position. In one embodiment, valve seat 830 may include two or more supports 836 further extending valve seat 830 and providing additional mechanical support for the hydraulic sealing of the poppet head 832 during closing of check valve 800. In one embodiment, space, channel or notch 814 that receives and supports at least a portion of valve seal 12 may include space for the expansion of valve seal 812 during compression and sealing.

As illustrated in FIG. 5, each support leg 124 of poppet guide 120 includes an inner peripheral surface 125. Inner peripheral surfaces 125 are curved such that inner peripheral surfaces 125 of all the support legs are at the same radial distance from the longitudinal center of poppet guide 120. Poppet guide 120, as illustrated, shown in FIGS. 2 and 5, may include four support legs 124 that extend from base 122 to stem guide 126, but as few as three or more than four can be used.

Stem guide 126 includes an inner surface defining a stem receiving channel 121. Inner surface of stem receiving channel 121 may include three or more guide vanes 128 projecting radially inward into stem receiving channel 121 Inner surface of stem guide 126 may also include auxiliary channels 129 formed between adjacent guide vanes 128. Auxiliary channels 129 are formed to, for example, clear debris for self-cleaning of the check valve. All of guide vanes 128 include an outer surface at the same radial distance from the center of stem receiving channel 121.

Figure 3:
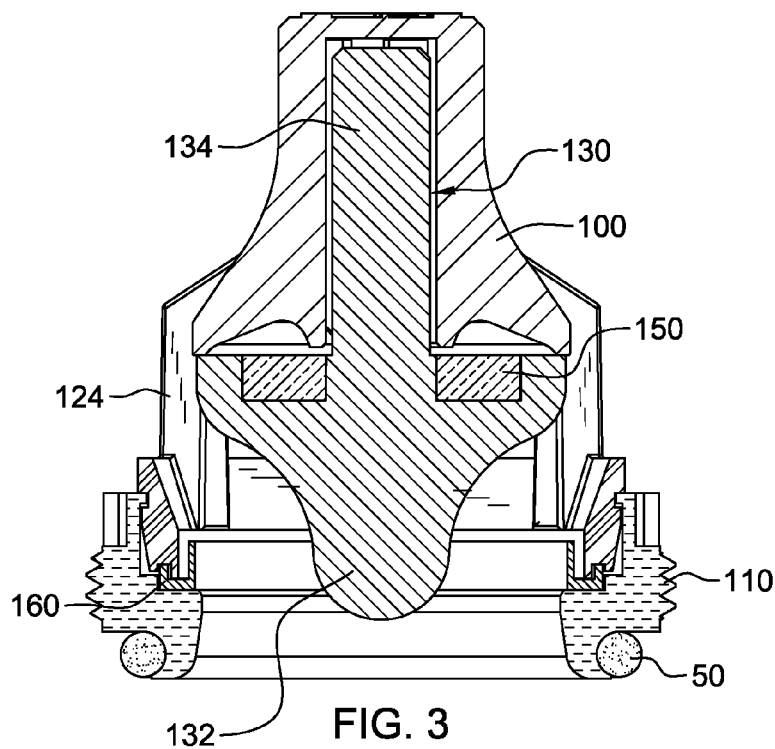
FIG. 3 depicts a longitudinal cross sectional view through a check valve constructed in accordance with one or more aspects of the invention, where the check valve is in a fully open position.
Figure 6:
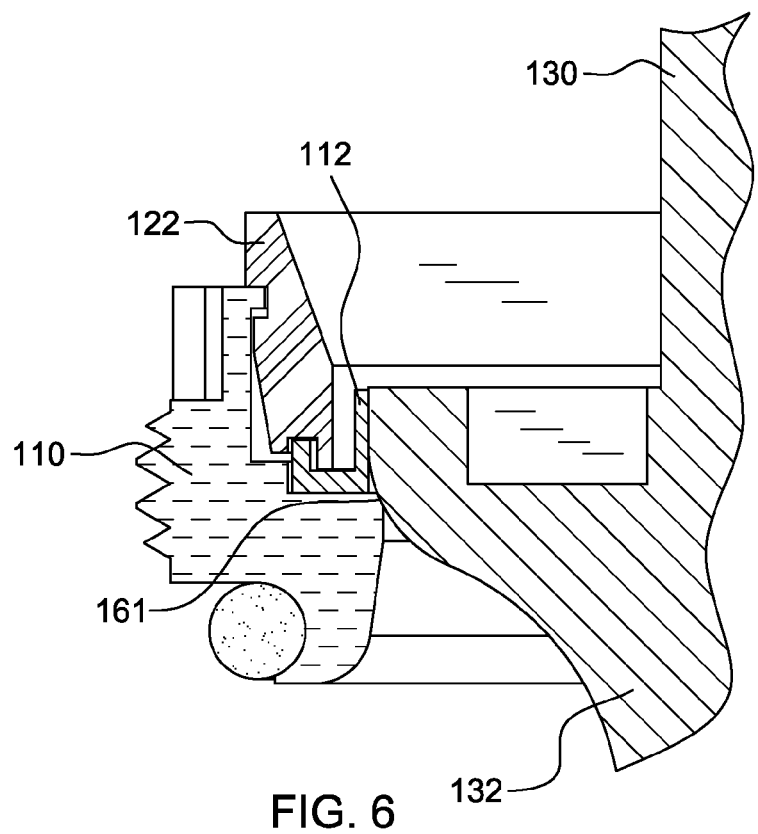
FIG. 6 depicts a partial cross sectional view illustrating one embodiment of an attachment between a valve ring and a poppet guide in accordance with one or more aspects of the invention.

In the illustrative example shown in FIGS. 1 and 2, poppet 130 includes a head 132 connected to a stem 134. Head 132 includes an outer peripheral surface 136 having an upper portion 137 and a lower portion 138. In one example, upper portion 137 comprises a diameter greater than lower portion 138 and greater than the diameter of the aperture formed in valve seat ring 110. In one embodiment, head 132 may be, for example, contoured or tear drop-shaped to maximize or improve laminar flow during, for example, high flow conditions, and minimize or reduce flow losses, higher flow efficiencies and less turbulence. In a fully open position, head 132 is stopped and supported by the bottom of stem guide 126 of poppet guide 120, as illustrated in FIG. 3. In a fully closed position, a portion of outer surface 136 of head 132 engages an outer surface of seal 112 of valve ring 110. In one embodiment, another portion of outer surface 136 of head 132 may be mechanically supported by a valve seat 161 defined by valve ring 110, as illustrated in FIG. 6.

Stem 134 may be cylindrical and telescopically received by stem receiving channel 121 of stem guide 126. Guide vanes 128 in stem receiving channel 121 aids in guiding the reciprocating movement of stem 134 of poppet 130 during opening and closing of the valve. According to one aspect of the present invention, poppet 130 is guided by both the engagement of stem 134 with guide vanes 128 and upper portion 137 of head 132 with inner peripheral surfaces 125 of support legs 124 to provide better guiding and more stable axial movement of the poppet between a fully open position to a fully closed position. As poppet 130 moves between a fully opened and closed positions, stem 134 cooperates with guide vanes 128 and upper portion 137 of head 132 cooperate with inner peripheral surfaces 125 of support legs 124 to maintain poppet 130 substantially in alignment with the valve seat.

Figure 4:
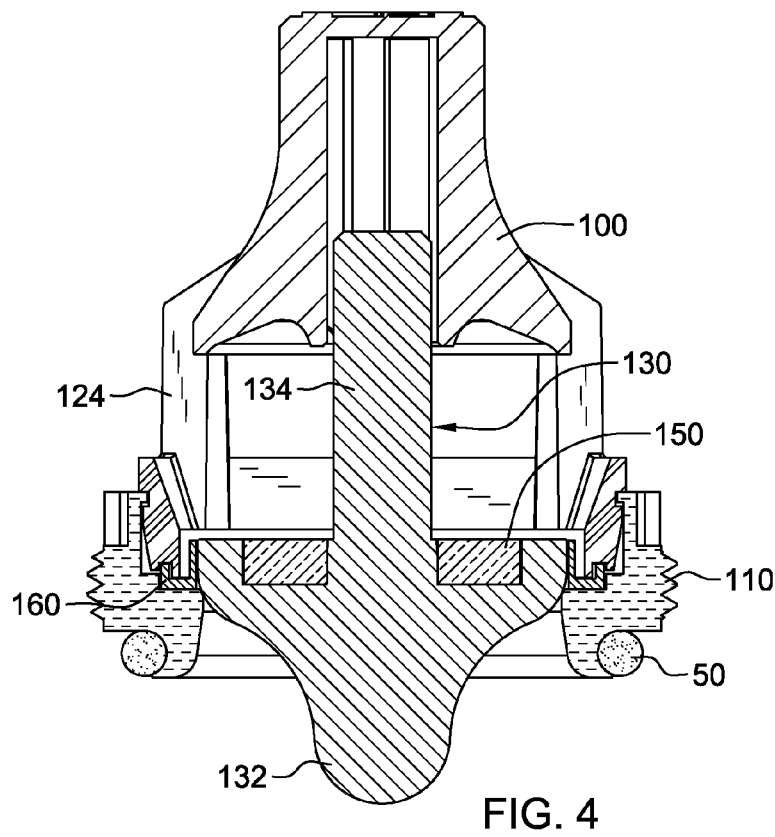
FIG. 4 depicts a longitudinal cross sectional view through a check valve constructed in accordance with one or more aspects of the invention, where the check valve is in a closed position.

The stability of poppet 130 may be increased by, for example, increasing the total length and/or diameter of stem 134 about which stem guide 126 is disposed. In one embodiment, the maximum stability of the poppet is achieved where the diameter of stem 134 is about twenty five percent of the distance that poppet 136 travels from a fully open position to a fully closed position, as illustrated in FIGS. 3 and 4. In an alternative embodiment, maximum hydraulic efficiencies may be achieved when poppet 136 is moveable by a distance between a closed position against the valve seat to a fully open position equal to approximately twenty-five percent of the diameter of the smallest valve orifice defined by valve seat 161. Similarly, embodiments where guide 120 is disposed about a greater portion of stem 134 are more stable than embodiments where guide 120 is disposed about a lesser portion of stem 134. In accordance with various aspects of the invention, the diameter of stem 134 and the stem guide 120 is disposed about may vary in order to achieve the amount of desired stability of poppet 130 such that other characteristics of check valve 100 are not compromised.

A check valve constructed in accordance with one or more principles of the present invention may include a spring extending between the bottom of stem guide 120 and poppet head telescopically coiled over the outer diameter of poppet stem 134 to bias poppet 130 into a closed position. A first end of the spring may be supported or, alternatively, anchored against the bottom of stem guide 120. Opposite end of the spring may be supported or, alternatively, anchored against the top surface of poppet head. As the force exerted by fluid pressure on head overcomes the force exerted by the spring, head is displaced upwardly and disengages from valve seat allowing fluid to flow through the valve. A spring may be used in a valve capable of handling variable fluid flow in either a vertical or horizontal direction. A spring, however, applies different forces to poppet head depending on the amount the spring is compressed or recoiled.

In an alternative embodiment, referring, for example, to FIG. 2, poppet 130 may include a weight 150. Weight 150 may be used to bias poppet 130 into a closed position in a valve capable of handling variable fluid flow in a vertical direction. Weight 150 may be centrally located in or on poppet head for quicker closing and poppet balance. Weight 150 may be made from, for example, stainless steel. Unlike a spring, weight 150 provides the same opening and closing force regardless of where head is in relation to the valve seat and does not store energy, like a recoiled spring. Use of a weight also prevents jamming of debris in the flow way.

Current check valve designs are compromised due to a lack of stability when they are not in a fully open or fully closed position. This lack of stability in partially open positions compromises the utility of these valves in connection with pumps that employ variable frequency drives. Pumps with variable frequency drives are capable of generating varying rates of fluid flow. At times, the variable fluid flow may be capable of overcoming the force of a spring required to keep the poppet in contact with the valve seat, but insufficient to displace the poppet to a fully open position. In conventional check valves, when a valve head is displaced from the valve seat, but not in a fully open position, the flow of fluid may cause the valve head to become misaligned. Also, conventional check valves that employ valve stems that extend through the valve aperture may also become misaligned or stuck, making the valve useless.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the disclosure may include only some of the described embodiments. Accordingly, the invention is not to be seen as limited by the foregoing description, but is only limited by the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A check valve for use in a housing, wherein the housing includes an inner peripheral surface defining a passage there through between an inlet and an outlet, said check valve comprising:
   a valve seat ring attachable to the housing, said valve seat ring defining a valve seat;
   a poppet guide, said poppet guide including a base attachable to the valve seat ring, a stem guide, and at least three support legs extending between the base and the stem guide, each of the at least three support legs including an inner peripheral surface, the stem guide including an inner surface defining a stem receiving channel, wherein at least three stem guide vanes extend radially inward from the inner surface of the stem guide into the stem receiving channel;
   a poppet, said poppet being moveable between a closed position against the valve seat to a fully open position, said poppet including a stem connected to a head, the head being resiliently biased in the closed position against the valve seat, the stem being telescopically received by the at least three stem guide vanes in the stem receiving channel of the stein guide, the head including an outer peripheral surface, wherein at least a first portion of the outer peripheral surface of the head extending circumferentially around the head engages the inner peripheral surfaces of the at least three support legs of said poppet guide as the poppet moves between the closed position to the fully open position, wherein a second portion of the outer peripheral surface of the head extending circumferentially around the head engages the valve seat in the closed position, and wherein a third portion of the outer peripheral surface of the head extending circumferentially around the head tapers outward; and
   a valve seal, said valve seal received by the valve seat and the base of said poppet guide to form a seal with the third portion of the outer peripheral surface of the head of said poppet when the check valve is in the closed position.

2. The check valve of claim 1, wherein said valve seal is an o-ring.

3. The check valve of claim 1, wherein the valve seat includes an expansion channel for receiving a portion of said valve seal during compression.

4. The check valve of claim 1, wherein the base includes an expansion channel for receiving a portion of said valve seal during compression of said valve seal.

5. The check valve of claim 1, further comprising a weight, said weight resiliently biasing the head in the closed position against the valve seat.

6. The check valve of claim 1, wherein the base of the poppet guide includes an outer peripheral surface, the outer peripheral surface includes threads that engage threads on the inner peripheral surface of the housing.

7. The check valve of claim 1, wherein the head of said poppet is tear-shaped.

8. The check valve of claim 1, wherein the valve seat includes a valve orifice defined by the smallest diameter of the valve seat, wherein said poppet being moveable between the closed position and the open position by a distance equal to approximately 25% of the valve orifice diameter.

9. The check valve of claim 1, wherein the stem receiving channel has a diameter that is equal to approximately 25% of the distance travelled by the poppet between a closed position against the valve seat to a fully open position.

10. The check valve of claim 6, wherein the head of said poppet is tear-shaped.

11. The check valve of claim 6, wherein the valve seat includes a valve orifice defined by the smallest diameter of the valve seat, wherein said poppet being moveable between the closed position and the open position by a distance equal to approximately 25% of the valve orifice diameter.

12. The check valve of claim 6, wherein the stem receiving channel has a diameter that is equal to approximately 25% of the distance travelled by the poppet between a closed position against the valve seat to a fully open position.

13. A check valve for use in a housing, wherein the housing includes an inner peripheral surface defining a passage there through between an inlet and an outlet, said check valve comprising:
   a valve seat ring attachable to the housing, said valve seat ring defining a valve seat;

a poppet guide, said poppet guide including a base attachable to the valve seat ring, a stem guide, and at least three support legs extending between the base and the stem guide, each of the at least three support legs including an inner peripheral surface, the stem guide including an inner surface defining a stem receiving channel, wherein at least three stem guide vanes extend radially inward from the inner surface of the stem guide into the stem receiving channel;

a poppet, said poppet being moveable between a closed position against the valve seat to a fully open position, said poppet including a stem connected to a head, the stem being telescopically received by the at least three stem guide vanes in the stem receiving channel of the stem guide, the head being resiliently biased in the closed position against the valve seat, the head including an outer peripheral surface, the outer peripheral surface including a space extending circumferentially around the head for receiving a valve seal, wherein the valve seal engages the valve seat when said poppet is in the closed position, wherein at least a first portion of the outer peripheral surface of the head extending circumferentially around the head engages the inner peripheral surfaces of the at least three support legs of said poppet guide as the poppet moves between the closed position to the fully open position.

14. The check valve of claim 13, wherein the outer peripheral surface of the head engages the valve seat on either side of the valve seal.

15. The check valve of claim 13, further comprising a weight, said weight resiliently biasing the head in the closed position against the valve seat.

16. The check valve of claim 13, wherein the valve seat includes at least one support for extending the valve seat and providing additional support to the poppet head in the closed position.

17. The check valve of claim 13, wherein the base of the poppet guide includes an outer peripheral surface, the outer peripheral surface includes threads that engage threads on the inner peripheral surface of the housing.

* * * * *